(12) United States Patent
Jeon et al.

(10) Patent No.: US 9,187,009 B2
(45) Date of Patent: Nov. 17, 2015

(54) APPARATUS AND METHOD FOR CONTROLLING COOLING OF ELECTRONIC COMPONENTS OF FUEL CELL VEHICLE

(71) Applicant: Hyundai Motor Company, Seoul (KR)

(72) Inventors: Soonil Jeon, Yongin-Si (KR); Kyuil Lee, Yongin-si (KR); Dae Jong Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/103,511

(22) Filed: Dec. 11, 2013

(65) Prior Publication Data

US 2014/0358341 A1 Dec. 4, 2014

(30) Foreign Application Priority Data

Jun. 3, 2013 (KR) .................. 10-2013-0063706

(51) Int. Cl.
*B60L 11/00* (2006.01)
*B60L 11/18* (2006.01)

(52) U.S. Cl.
CPC ............. *B60L 11/1892* (2013.01); *Y02E 60/50* (2013.01); *Y02T 10/7005* (2013.01)

(58) Field of Classification Search
USPC .................... 701/22; 180/65.1, 65.21, 65.225
See application file for complete search history.

(56) References Cited

U.S. PATENT DOCUMENTS

| | | | | |
|---|---|---|---|---|
| 5,006,425 | A * | 4/1991 | Takabayashi | 429/423 |
| 7,311,984 | B2 * | 12/2007 | Ueda et al. | 429/438 |
| 7,395,787 | B1 * | 7/2008 | Claypole et al. | 123/41.01 |
| 7,682,717 | B2 | 3/2010 | Ueda et al. | |
| 8,241,805 | B2 * | 8/2012 | Ueda et al. | 429/434 |
| 8,613,334 | B2 * | 12/2013 | Masaki | 180/65.31 |
| 8,783,396 | B2 * | 7/2014 | Bowman | 180/65.285 |
| 2011/0060470 | A1 * | 3/2011 | Campbell et al. | 700/282 |
| 2013/0128918 | A1 * | 5/2013 | Campbell et al. | 374/57 |
| 2013/0333865 | A1 * | 12/2013 | Goth et al. | 165/104.31 |

FOREIGN PATENT DOCUMENTS

| | | |
|---|---|---|
| JP | 2004328914 A | 11/2004 |
| JP | 4686290 B2 | 5/2011 |

* cited by examiner

*Primary Examiner* — Yonel Beaulieu
(74) *Attorney, Agent, or Firm* — McDermott Will & Emery LLP (57) ABSTRACT

An apparatus and method for controlling cooling of electronic components of a fuel cell vehicle are provided. The apparatus for controlling cooling of electronic components connected in series and parallel with a coolant loop in a fuel cell vehicle using a pump includes a monitor configured to collect measured temperature of the electronic components and a measured temperature of a coolant through a plurality of temperature sensors, and a controller configured to control the RPM of the pump based on the measured temperatures and at least one of electronic component temperature maps, a coolant temperature map and a temperature difference map representing temperature differences between the electronic components and coolant, the controller controlling the RPM of the pump using over-temperature set information and over-temperature reset information of each temperature map.

16 Claims, 5 Drawing Sheets

APPARATUS AND METHOD FOR CONTROLLING COOLING OF ELECTRONIC COMPONENTS OF FUEL CELL VEHICLE

CROSS-REFERENCE TO RELATED APPLICATION

This application claims priority to and the benefit of Korean Patent Application No. 10-2013-0063706 filed in the Korean Intellectual Property Office on Jun. 3, 2013, the entire contents of which are incorporated herein by reference.

BACKGROUND

1. Technical Field

The present disclosure relates to an apparatus and method for controlling cooling of electronic components of a fuel cell vehicle.

2. Background

In general, a fuel cell is composed of an electrode producing an electrochemical reaction, an electrolyte membrane for transferring hydrogen ions generated by the electrochemical reaction and a bipolar plate for supporting the electrode and the electrolyte membrane.

Electronic components included in a fuel cell vehicle are heated to 80° C. when the fuel cell is operated in a full power state, and thus the electronic components must be cooled using coolant.

Figure 1:
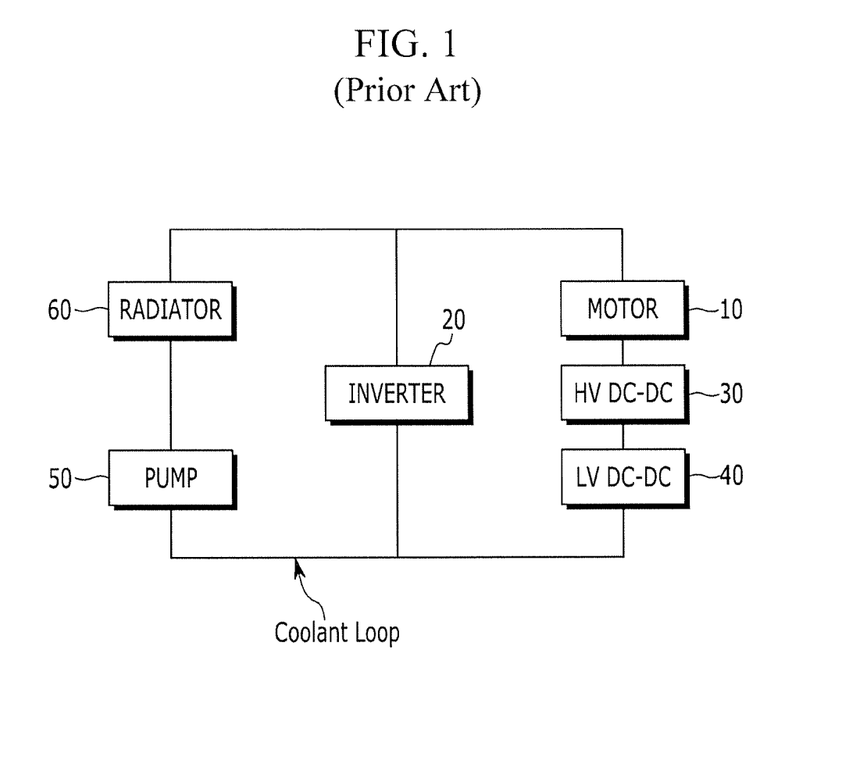
FIG. 1 illustrates electronic components and a coolant loop of a conventional fuel cell vehicle.

FIG. 1 illustrates electronic components and a coolant loop of a conventional fuel cell vehicle.

Referring to FIG. 1, the fuel cell vehicle includes a motor 10, an inverter 20 for the motor, a high voltage DC-DC converter 30 (referred to as HV DC-DC hereinafter) and a low voltage DC-DC converter 40 (referred to as LV DC-DC hereinafter) as electronic components.

It is difficult to provide an individual coolant loop for each of the electronic components due to costs and packaging issues. Accordingly, the electronic components are connected in series and parallel with a coolant loop and cooled through a pump 50. This requires efficient cooling control.

However, a conventional cooling control technique cannot efficiently control cooling of the inverter 20 performing Insulated Gate Bipolar mode Transistor (IGBT) switching, HV DC-DC converter 30 and LV DC-DC converter 40 since the pump 50 is driven based on a signal of a coolant temperature sensor (not shown) attached to the coolant loop. To solve this problem, the conventional cooling control technique excessively drives the pump 50 even when the coolant temperature sensor signal indicates a relatively low temperature. This reduces fuel efficiency and generates noise.

The above information disclosed in this background section is only for enhancement of understanding of the background of the disclosure.

SUMMARY

The present disclosure has been made in an effort to provide an apparatus and method for controlling cooling of electronic components of a fuel cell vehicle having advantages of efficiently controlling operating temperatures of a motor and electronic components performing IGBT switching, which are connected through a serial and parallel coolant loop, to be maintained in an allowable range.

Another object of the present disclosure is to provide an apparatus and method for controlling cooling of electronic components of a fuel cell vehicle, which reduce noise through minimum operation of a pump in a transient operation period and minimize operation of the pump in an operation region other than a high torque region, improving fuel efficiency.

An exemplary embodiment of the present disclosure provides an apparatus for controlling cooling of electronic components connected in series and parallel with a coolant loop in a fuel cell vehicle using a pump, including: a monitor configured to collect measured temperature of the electronic components and a measured temperature of a coolant through a plurality of temperature sensors; and a controller configured to control the RPM of the pump based on the measured temperatures and at least one of electronic component temperature maps, a coolant temperature map and a temperature difference map representing temperature differences between the electronic components and coolant, the controller controlling the RPM of the pump using over-temperature set information and over-temperature reset information of each temperature map.

Another embodiment of the present disclosure provides an apparatus for controlling cooling of electronic components connected in series and parallel with a coolant loop in a fuel cell vehicle using a pump, including: a monitor configured to collect measured temperature of the electronic components and a measured temperature of coolant through a plurality of temperature sensors; and a controller configured to control the RPM of the pump based on the measured temperatures and at least one of electronic component temperature maps, a coolant temperature map and a map representing temperature differences between the electronic components and coolant, the controller performing feed-forward (FF) control for increasing the RPM of the pump preemptively upon detection of continuation of high torque and high temperature state for a predetermined time based on a motor torque reference value and an inverter temperature.

The electronic components may include at least one of a motor, an inverter, a high voltage DC-DC converter and a low voltage DC-DC converter, and the temperature maps may include pump RPM command value information for cooling control according to the measured temperature.

The controller may derive pump RPM command values for the measured temperatures of the electronic components and coolant, collected by the monitor, based on the electronic temperature maps, coolant temperature map and temperature difference map. When at least one of a motor temperature, an inverter temperature, an HV DC-DC converter temperature, an LV DC-DC converter temperature, and temperature differences between the electronic components and coolant exceeds a predetermined over-temperature reference value, the controller may determine that an electronic component corresponding to the temperature is in an over-temperature set state and apply a maximum value of pump RPM command values derived through the temperature maps as a final pump RPM command value.

When all the measured temperatures are lower than the over-temperature reference value and a vehicle speed is not low, the controller may apply the maximum value of the pump RPM command values derived through the temperature maps as the final pump RPM command value.

The controller may initiate feed-forward control for setting the RPM of the pump to higher than a normal value when a state that the motor torque reference value is higher than a first reference value for judgment of a high torque and the inverter temperature is higher than a second reference value for judgment of a high temperature is maintained for a time corresponding to a predetermined third reference value.

The controller may cancel the feed-forward control and return the pump RPM to the normal value when a state that the motor torque reference value is lower than a fourth reference value corresponding to a high torque state and the inverter temperature is lower than a fifth reference value corresponding to a high temperature state is maintained for a time corresponding to a predetermined sixth reference value.

The controller may detect a transient operation period in which the vehicle is in idling and creeping speed regions and apply a predetermined low RPM as a final pump RPM command value.

Yet another embodiment of the present disclosure provides a method for controlling cooling of electronic components connected in series and parallel with a coolant loop in a fuel cell vehicle using a pump, including: collecting measured temperature of the electronic components and a measured temperature of coolant through a monitor; deriving pump RPM command values corresponding to the measured temperatures based on at least one of electronic component temperature maps, a coolant temperature map and a temperature difference map representing temperature differences between the electronic components and coolant; checking an over-temperature state with respect to each measured temperature based on each temperature map and setting an over-temperature set state and an over-temperature reset state of each measured temperature; performing feed-forward control for increasing the RPM of the pump when a high torque and high temperature state is maintained for a predetermined time based on a motor torque reference value and an inverter temperature; and applying a maximum value of the pump RPM command values derived through the temperature maps as a final pump RPM command value when the feed-forward control condition is not satisfied and at least one of the measured temperatures corresponds to the over-temperature set state (OT_Set).

The deriving of the pump RPM command values may include deriving a pump RPM command value for at least one of a motor temperature, an inverter temperature, a high voltage DC-DC converter temperature, a low voltage DC-DC converter temperature, and temperature differences between the electronic components and coolant.

The setting of the over-temperature set state and over-temperature reset state may include checking whether at least one of a motor temperature, an inverter temperature, a high voltage DC-DC converter temperature, a low voltage DC-DC converter temperature, and temperature differences between the electronic components and coolant corresponds to an over-temperature state.

The performing of feed-forward control may include deriving a feed-forward pump RPM command value as a value greater than a predetermined percent of a maximum pump RPM upon initiation of feed-forward control; and applying a maximum value from among the pump RPM command values for the measured temperatures and the feed-forward pump RPM command value as a final pump RPM command value.

The method may further include controlling the final pump RPM command value to be a value lower than a predetermined percent of the maximum pump RPM when the feed-forward control condition is not satisfied, each measured temperature corresponds to the over-temperature reset state and the vehicle is in a parking state, neutral state or low-speed state corresponding to a speed lower than a predetermined speed.

DETAILED DESCRIPTION

An apparatus and method for controlling cooling of electronic components of a fuel cell vehicle according to exemplary embodiments of the present disclosure will now be described in detail with reference to the attached drawings.

Figure 2:
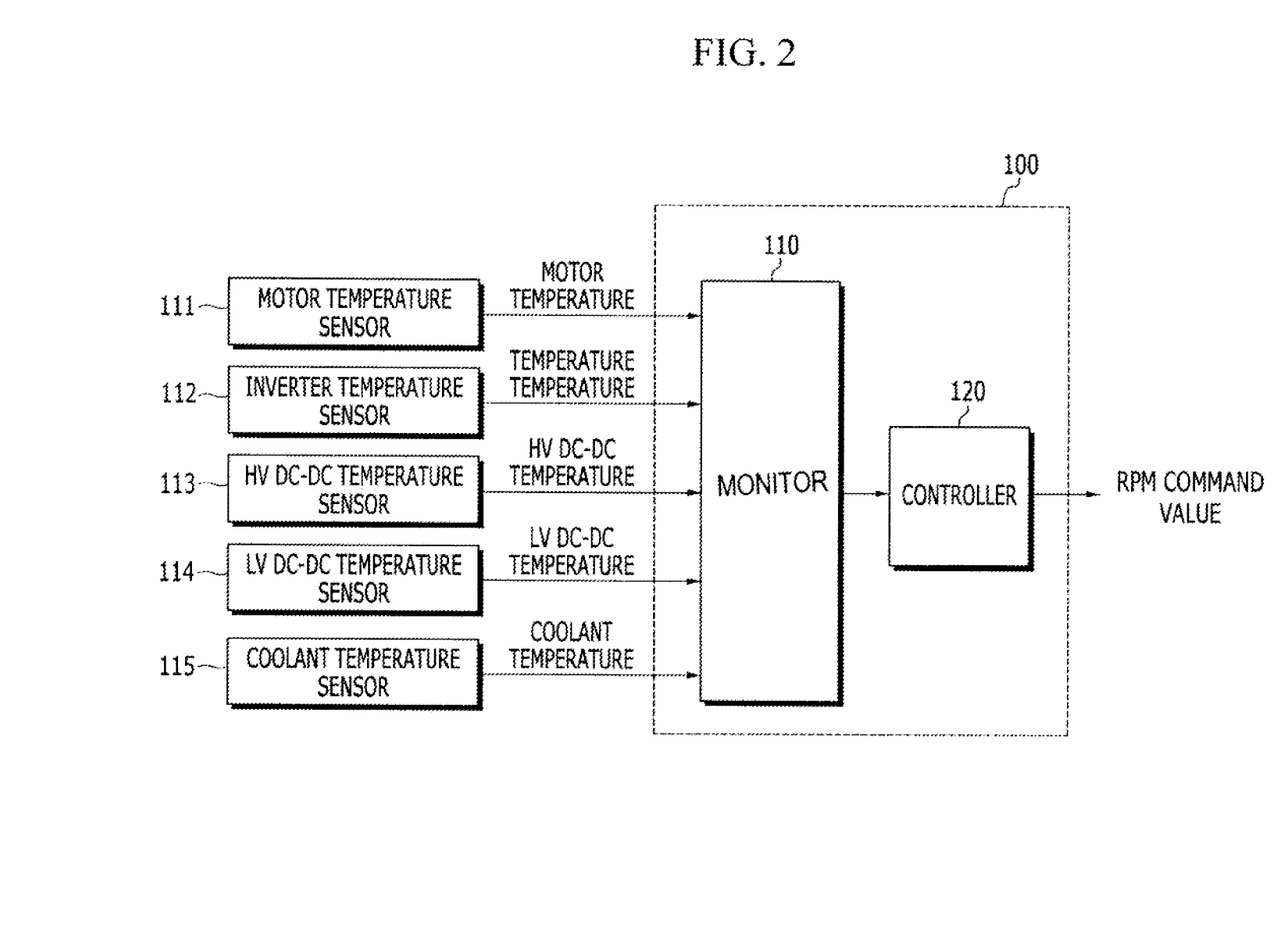
FIG. 2 is a block diagram of an apparatus for controlling cooling of electronic components of a fuel cell vehicle according to an exemplary embodiment of the present disclosure.

FIG. 2 is a block diagram of an apparatus for controlling cooling of electronic components of a fuel cell vehicle according to an exemplary embodiment of the present disclosure.

Referring to FIG. 2, an apparatus 100 for controlling cooling of electronic components of a fuel cell vehicle includes a monitor 110 for collecting measured temperatures of electronic components of the fuel cell vehicle and a controller 120 for controlling the RPM of a pump based on the measured temperatures.

The electronic components may include a motor, an inverter, an HV DC-DC and an LV DC-DC. A coolant loop of the fuel cell vehicle is connected in series and parallel with the electronic components and the electronic components are cooled through a pump.

The monitor 110 collects measured temperatures of the electronic components and a measured temperature of a coolant through a motor temperature sensor 111, an inverter temperature sensor 112, an HV DC-DC temperature sensor 113, an LV DC-DC temperature sensor 114 and a coolant temperature sensor 115 in real time.

In addition, the monitor 110 can monitor the overall operating state of the vehicle, such as a shift-speed, vehicle speed, etc., in connection with controllers (not shown) in the vehicle.

The controller 120 controls the RPM of the pump based on at least one of electronic component temperature maps, a coolant temperature map and a temperature difference map representing temperature differences between the electronic components and coolant. Here, the controller 120 efficiently controls the RPM of the pump using over-temperature set (OT_Set) information and over-temperature reset (OT_Reset) information of the temperature maps.

Figure 3:
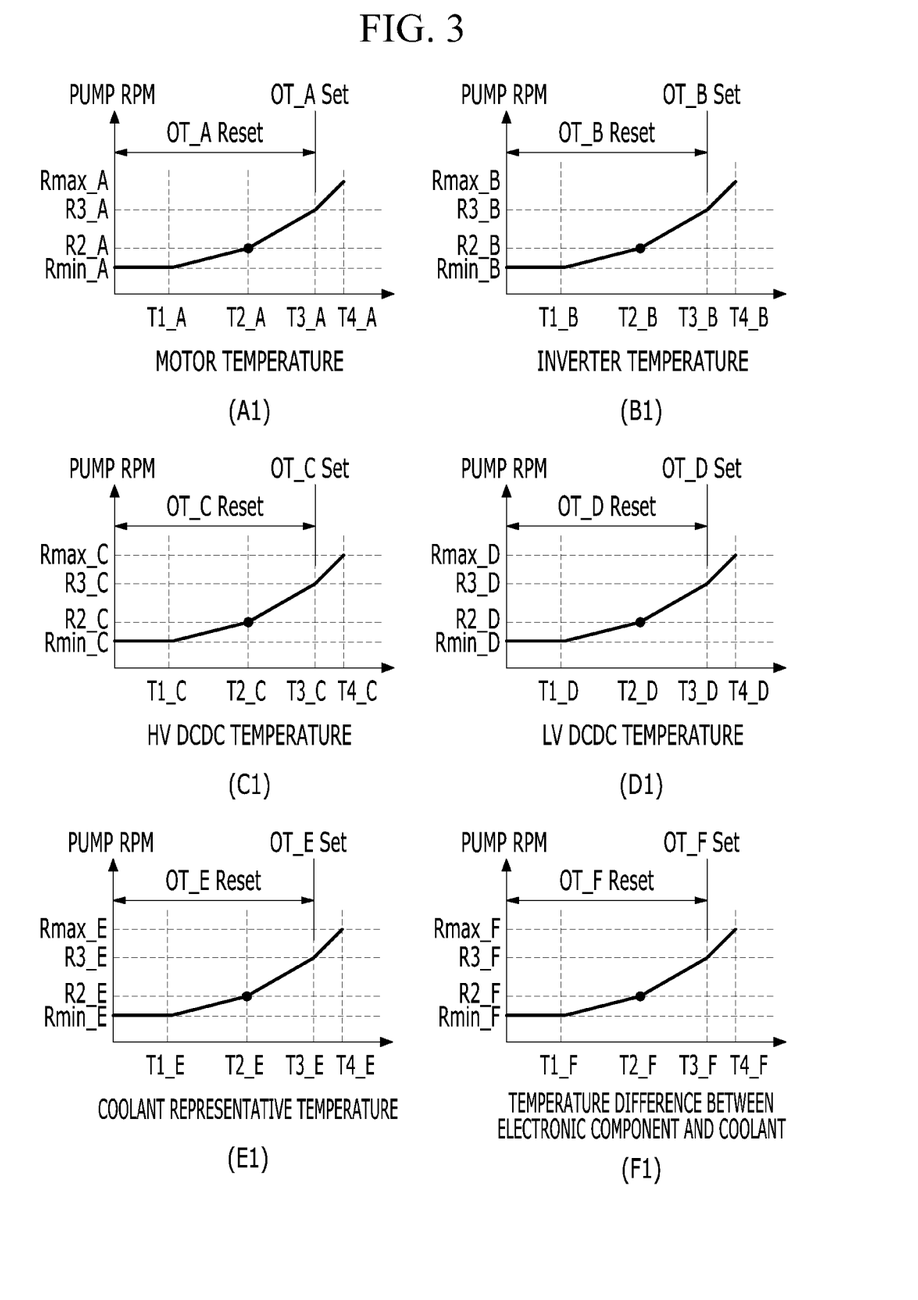
FIG. 3 shows temperature maps used for cooling control according to an exemplary embodiment of the present disclosure.

FIG. 3 illustrates temperature maps used for cooling control according to an exemplary embodiment of the present disclosure.

Referring to FIG. 3, the controller 120 stores a motor temperature map A1, an inverter temperature map B1, an HV DC-DC temperature map C1, an LV DC-DC temperature map D1, a coolant temperature map E1 and a temperature difference map F1 representing temperature differences between the electronic components and coolant.

In FIG. 3, temperatures are denoted by Tn_A, Tn_B, Tn_C, Tn_D, Tn_E and Tn_F and pump RPM command values corresponding to the temperatures are denoted by Rm_A, Rm_B, Rm_C, Rm_D, Rm_E and Rm_F.

The controller 120 derives pump RPM command values for temperatures of the electronic components and coolant, collected by the monitor 110, based on the electronic component temperature maps A1, B1, C1 and D1, the coolant temperature map E1 and the temperature difference map F1.

For example, in the case of temperatures T2_A, T2_B, T2_C, T2_D, T2_E and T2_F, pump RPM command values R2_A, R2_B, R2_C, R2_D, R2_E and R2_F corresponding to the temperatures can be derived.

The controller 120 controls the RPM of the pump based on the measured temperatures collected by the monitor 110 and at least one of the electronic component temperature maps A1, B1, C1 and D1, coolant temperature map E1 and temperature difference map F1. A detailed control method is described through the following embodiments.

Exemplary Embodiment 1

The controller 120 controls the RPM of the pump using over-temperature set (OT_Set) information and over-temperature reset (OT_Reset) information of each map.

The controller 120 previously sets an over-temperature reference value for checking over-temperature state to each temperature map. When the motor temperature, inverter temperature, HV DC-DC temperature, LV DC-DC temperature, coolant representative temperature and a temperature difference between an electronic component and the coolant are higher than the over-temperature reference value, the controller 120 determines that the temperatures correspond to an over-temperature state (OT_Set). When the temperatures are lower than the over-temperature reference value, the controller 120 determines that the temperatures correspond to an over-temperature reset state (OT_Reset).

When the controller 120 confirms that at least one of the motor temperature, inverter temperature, HV DC-DC temperature, LV DC-DC temperature, coolant representative temperature and temperature difference corresponds to the over-temperature state (OT_Set), the controller 120 can apply a maximum value of pump RPM command values Rm_A to Rm_F for the measured temperatures as a final pump RPM command value.

Furthermore, when the controller 120 determines that the measured temperatures are lower than the over-temperature reference value, the controller 120 can apply the final pump RPM command value as a normal value. Here, the normal value may be one of pump RPM command values derived based on the temperature maps, which will be described hereinafter, or the average of the pump RPM command values.

Exemplary Embodiment 2

The controller 120 can detect continuation of a high-torque and high-temperature state for a predetermined time based on a motor torque reference and the inverter temperature to perform feed-forward (FF) control for increasing the RPM of the pump preemptively.

An FF control condition is described in detail through the following embodiment and reference values for the control condition can be set as follows.

TH1 and TH4 refer to reference values with respect to the motor high torque state and can be set to values in the range of 20 to 100% when a maximum value of a motor torque reference is 100%.

TH2 and TH5 refer to reference values with respect to inverter high temperature state and can be set to values in the range of 20° C. to 70° C.

TH3 and TH6 refer to reference durations for which the motor high torque state and inverter high temperature state are maintained and can be set to values in the range of 0.5 to 10 seconds.

The reference values are not limited to the above-described values and best values derived through various experiments can be applied as the reference values.

(1) FF Control on Condition: (Motor Torque Reference Value≥TH1) and (Inverter Temperature≥TH2) and (Duration≥TH3):

The controller 120 may initiate FF control when, in a state that a motor torque reference value is higher than the first reference value TH1, the inverter temperature is higher than the second reference value TH2 is maintained for a time corresponding to the third reference value TH3. Here, the RPM of the pump can be set higher than a normal value through FF control.

Although the motor torque reference value may be used to check whether the vehicle speed is high or low under the control condition, the motor torque reference value needs to be discriminated from the vehicle speed since the motor torque reference value may become different from the actual vehicle speed according to a gradient of a road.

That is, when the vehicle speed is applied, the actual vehicle speed decreases when the vehicle runs on a steep uphill road due to load of the road even if the motor torque reference value is higher than the first reference value TH1 corresponding to high speed control, and thus cooling performance is deteriorated in spite of high temperature.

On the contrary, when the vehicle runs on a steep downhill, the actual vehicle speed may increase due to downhill acceleration even if the motor torque reference value is lower than the first reference value TH1 corresponding to low speed control, and thus excessive cooling control is unnecessarily performed.

(2) FF Control Off Condition: (Motor Torque Reference Value<TH4) and (Inverter Temperature<TH5) and (Duration≥TH6):

When the motor torque reference value is lower than the fourth reference value TH4, the inverter temperature is lower than the fifth reference value TH5 and this state is maintained for a time corresponding to the sixth reference value TH6, the controller 120 may cancel FF control and return the RPM of the pump to the normal value.

(3) RPM Command Value when FF Control on: R_FF:

Upon initiation of FF control, the controller 120 may derive an FF pump RPM command value R_FF. Here, R_FF may be a value representing a high RPM greater than or equal to a predetermined percent (e.g. 40%) of the maximum pump RPM.

The controller 120 may detect a transient driving period in which the vehicle is in idling and creeping speed regions and minimizes operation of the pump as long as cooling of the electronic components is not generated, thereby reducing noise.

For example, the controller 120 may apply a low RPM R_min as a final pump RPM command value when the shift range is in parking P range or neutral N range or the vehicle speed is low, the temperatures of all electronic components correspond to low-temperature state OT_Reset based on the temperature maps and FF control is off. Here, R_min may be a value representing a low RPM less than a predetermined percent (e.g. 40%) of the maximum pump RPM.

Exemplary Embodiment 3

A description will be given of a method for controlling cooling of electronic components of a fuel cell vehicle according to an exemplary embodiment of the present disclosure based on the configuration of the above-described cooling control apparatus 100 including the first and second embodiments.

Figure 4:
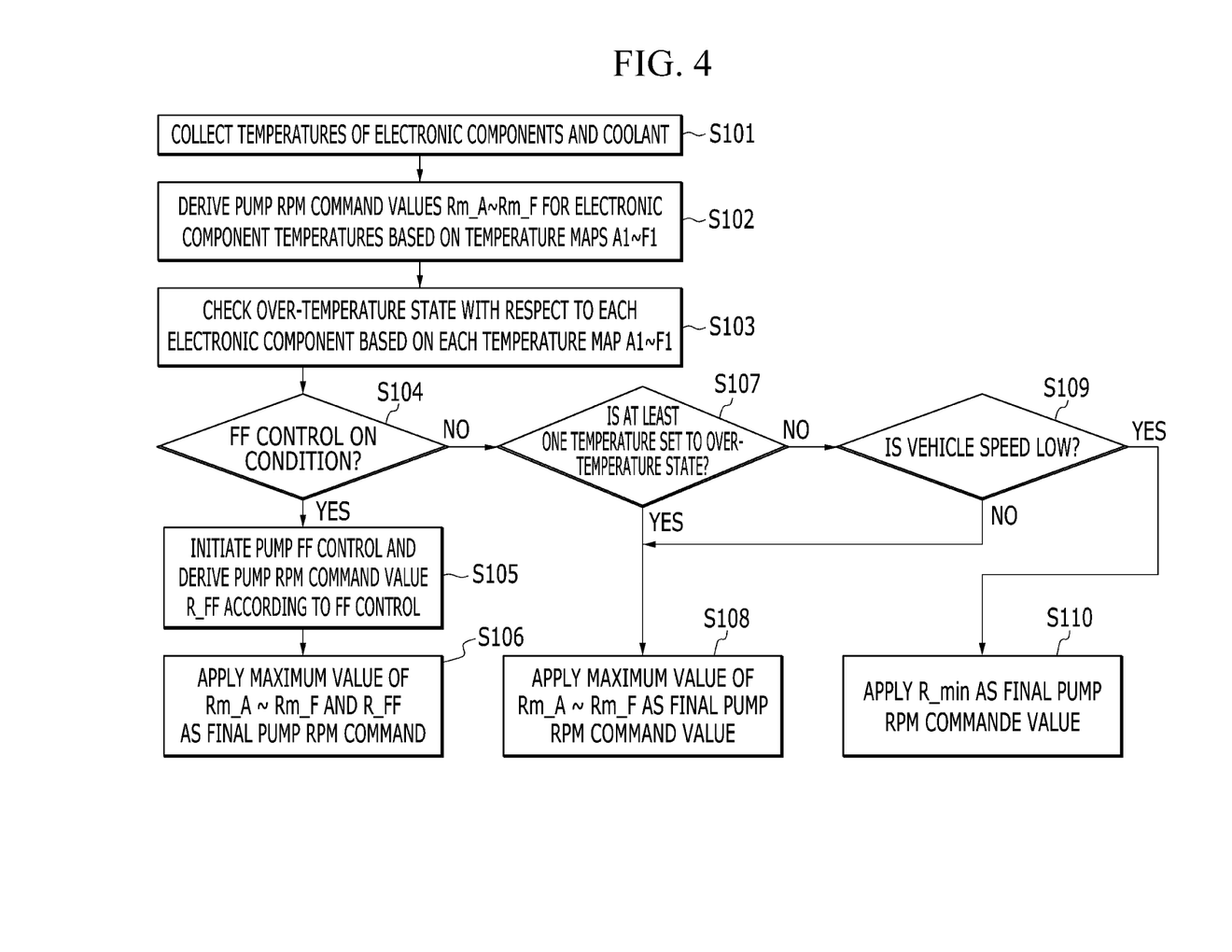
FIG. 4 is a flowchart illustrating a method for controlling cooling of electronic components of a vehicle according to an exemplary embodiment of the present disclosure.

FIG. 4 is a flowchart illustrating a method for controlling cooling of electronic components of a fuel cell vehicle according to an exemplary embodiment of the present disclosure.

Referring to FIG. 4, the cooling control apparatus 100 may collect electronic component temperatures and coolant temperature through the monitor 110 (S101).

The cooling control apparatus 100 may derive pump RPM command values Rm_A to Rm_F for the electronic component temperatures based on the temperature maps A1 to F1 (S102).

Step S102 is described in detail.

The cooling control apparatus 100 may derive a pump RPM command value Rm_A for the motor temperature based on the motor temperature map A1.

The cooling control apparatus 100 may derive a pump RPM command value Rm_B for the inverter temperature based on the inverter temperature map B1.

The cooling control apparatus 100 may derive a pump RPM command value Rm_C for the HV DC-DC temperature based on the HV DC-DC temperature map C1.

The cooling control apparatus 100 may derive a pump RPM command value Rm_D for the LV DC-DC temperature based on the LV DC-DC temperature map D1.

The cooling control apparatus 100 may derive a pump RPM command value Rm_E for the current coolant representative temperature based on the coolant temperature map E1.

The cooling control apparatus 100 may derive a pump RPM command value Rm_F for the current temperature difference, which is a temperature difference between an electronic component and the coolant representative temperature, based on the temperature difference map F1.

The cooling control apparatus 100 may check an over-temperature state of each electronic component based on the corresponding temperature map A1 to F1 and set the over-temperature reference value when the temperature of the corresponding electronic component exceeds the over-temperature reference value (S103).

Step S103 is further described below.

The cooling control apparatus 100 may check whether the current motor temperature corresponds to over-temperature state based on the motor temperature map A1 and set OT_A when the current motor temperature corresponds to over-temperature state.

The cooling control apparatus 100 may check whether the current inverter temperature corresponds to the over-temperature state based on the inverter temperature map B1 and set OT_B when the current inverter temperature corresponds to the over-temperature state.

The cooling control apparatus 100 may check whether the current HV DC-DC temperature corresponds to the over-temperature state based on the HV DC-DC temperature map C1 and set OT_C when the current HV DC-DC temperature corresponds to the over-temperature state.

The cooling control apparatus 100 may check whether the current LV DC-DC temperature corresponds to the over-temperature state based on the LV DC-DC temperature map D1 and set OT_D when the current LV DC-DC temperature corresponds to the over-temperature state.

The cooling control apparatus 100 may check whether the current coolant representative temperature corresponds to the over-temperature state based on the coolant temperature map E1 and set OT_E when the current coolant representative temperature corresponds to the over-temperature state.

The cooling control apparatus 100 may check whether the current temperature difference corresponds to the over-temperature state based on the temperature difference map F1 and set OT_F when the current temperature difference corresponds to the over-temperature state.

The cooling control apparatus 100 may check whether the FF control ON condition that a duration during which the motor torque reference value is higher than the first reference value TH1 and the inverter temperature is higher than the second reference value TH2 is longer than the time corresponding to the third reference value TH3 is satisfied (S104).

When the FF control ON condition is satisfied in step S104, the cooling control apparatus 100 may initiate pump FF control and derive a pump RPM command value R_FF according to FF control (S105).

The cooling control apparatus 100 may apply a maximum value of Rm_A to Rm_F and R_FF as a final pump RPM command value (S106).

When the FF control ON condition is not satisfied in step S104, the cooling control apparatus 100 may check whether at least one of the temperatures of the electronic components corresponds to the over-temperature state (S107).

When the cooling control apparatus 100 confirms that at least one of the temperatures of the electronic components corresponds to the over-temperature state, the cooling control apparatus may apply a maximum value of pump RPM command values Rm_A to Rm_F as a final pump RPM command value (S108).

When the cooling control apparatus 100 determines that the temperatures of the electronic components do not correspond to the over-temperature state in step S107, the cooling control apparatus 100 may check whether the vehicle speed is low (S109).

For example, the cooling control apparatus 100 applies R_min as the final pump RPM command value when the shift range corresponds to parking P range or neutral N range or the vehicle speed is lower than 20 kph (S110).

The cooling control apparatus 100 may perform step S108 when the vehicle is not in a low-speed state under the above-described condition.

After step S106, pump FF state can be off if a state that the motor torque reference value is lower than the fourth reference value TH4 and the inverter temperature is lower than the fifth reference value TH5 is maintained for a time corresponding to the sixth reference value TH6.

The over-temperature state with respect to the electronic component temperature maps A1, B1, C1 and D1, coolant temperature map E1 and temperature difference map F1 may be cancelled when the temperatures of the electronic components and coolant are lower than the over-temperature reference value. When the over-temperature state is cancelled, over-temperature set may be reset (OT_A Reset to OT_F Reset).

Figure 5:
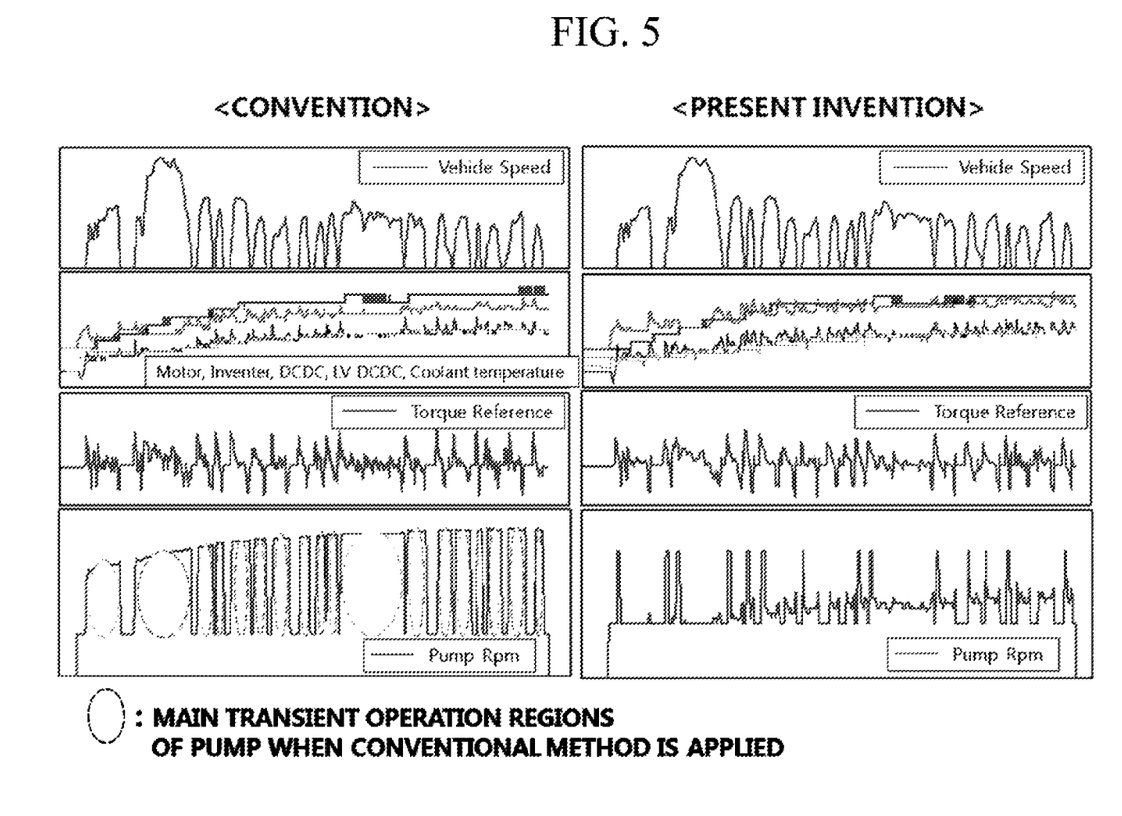
FIG. 5 shows graphs comparing electronic component cooling control results of a conventional method with electronic component cooling control results of the method according to the exemplary embodiment of the present disclosure.

FIG. 5 shows graphs comparing electronic component cooling control results of a conventional method with an electronic component cooling control results of the control method according to the exemplary embodiments of the present disclosure.

Referring to FIG. 5, under the same vehicle and operation conditions, the conventional electronic component cooling control method indicates main transient operation regions of the pump and thus the pump is excessively driven in a transient operation period, reducing fuel efficiency and generating excessive noise.

On the other hand, the electronic component cooling control method according to the exemplary embodiments of the present disclosure can solve a noise problem caused by the pump during vehicle creep operation or idling after high power operation of the vehicle by reducing noise through minimum operation of the pump in the transient operation period.

It can be confirmed from a test result of an urban dynamometer driving schedule (UDDS) mode exclusive of the high torque region of the motor that fuel efficiency is improved by 1% or more compared to the conventional method.

Furthermore, pump RPM control using operating temperatures of electronic components such as a motor, inverter, HV DC-DC, LV DC-DC, etc. and over-temperature set and reset information can be performed to maintain the operating temperatures of the electronic components connected in series and parallel with a coolant loop in an allowable range.

Exemplary embodiments of the present disclosure may be implemented through programs for executing functions corresponding to configurations of the embodiments and recording media storing the programs as well as the above-described apparatus and/or method, and this implementation can be achieved by those skilled in the art according to the above-described embodiments.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An apparatus for controlling cooling of electronic components connected in series and parallel with a coolant loop in a fuel cell vehicle using a pump, comprising:
    a monitor configured to collect a measured temperature of the electronic components and a measured temperature of a coolant through a plurality of temperature sensors; and
    a controller configured to control a revolutions per minute (RPM) of the pump based on the measured temperatures and at least one of electronic component temperature maps, a coolant temperature map, and a temperature difference map representing temperature differences between the electronic components and the coolant, the controller controlling the RPM of the pump using over-temperature set information and over-temperature reset information of each temperature map,
    wherein, when at least one of a motor temperature, an inverter temperature, a high voltage (HV) DC-DC converter temperature, a low voltage (LV) DC-DC converter temperature, and the temperature differences between the electronic components and the coolant exceeds an over-temperature reference value, the controller determines that an electronic component corresponding to the temperature is in an over-temperature set state and applies a maximum value of pump RPM command values derived through the temperature maps as a final pump RPM command value.

2. An apparatus for controlling cooling of electronic components connected in series and parallel with a coolant loop in a fuel cell vehicle using a pump, comprising:
    a monitor configured to collect a measured temperature of the electronic components and a measured temperature of a coolant through a plurality of temperature sensors; and
    a controller configured to control an RPM of the pump based on the measured temperatures and at least one of electronic component temperature maps, a coolant temperature map and a temperature difference map representing temperature differences between the electronic components and the coolant, the controller performing feed-forward (FF) control for increasing the RPM of the pump preemptively upon detection of continuation of a high torque and high temperature state for a predetermined period of time based on a motor torque reference value and an inverter temperature.

3. The apparatus of claim 1, wherein the electronic components include at least one of a motor, an inverter, an HV DC-DC converter, and an LV DC-DC converter, and the temperature maps include pump RPM command value information for the cooling control according to the measured temperatures.

4. The apparatus of claim 1, wherein the controller is further configured to derive the pump RPM command values for the measured temperatures of the electronic components and the coolant, collected by the monitor, based on the electronic temperature maps, the coolant temperature map, and the temperature difference map.

5. The apparatus of claim 1, wherein, when all the measured temperatures are lower than the over-temperature reference value and a vehicle speed is not low, the controller applies the maximum value of the pump RPM command values derived through the temperature maps as the final pump RPM command value.

6. The apparatus of claim 2, wherein the electronic components include at least one of a motor, an inverter, an HV DC-DC converter, and an LV DC-DC converter, and the temperature maps include pump RPM command value information for the cooling control according to the measured temperatures.

7. The apparatus of claim 2, wherein the controller derives pump RPM command values for the measured temperatures of the electronic components and the coolant, collected by the monitor, based on the electronic temperature maps, the coolant temperature map, and the temperature difference map.

8. The apparatus of claim 2, wherein the controller is configured to initiate the FF control for setting the RPM of the pump to higher than a normal value when the motor torque reference value is higher than a first reference value for judgment of a high torque and the inverter temperature is higher than a second reference value for judgment of a high temperature is maintained for a time corresponding to a third reference value.

9. The apparatus of claim 8, wherein the controller is configured to cancel the FF control and returns the pump RPM to the normal value when a state that the motor torque reference value is lower than a fourth reference value corresponding to a high torque state and the inverter temperature is lower than a fifth reference value corresponding to a high temperature state is maintained for a time corresponding to a sixth reference value.

10. The apparatus of claim 1, wherein the controller is configured to detect a transient operation period in which the vehicle is in idling and creeping speed regions and applies a predetermined low RPM as a final pump RPM command value.

11. The apparatus of claim 2, wherein the controller is configured to detect a transient operation period in which the vehicle is in idling and creeping speed regions and applies a predetermined low RPM as a final pump RPM command value.

12. A method for controlling cooling of electronic components connected in series and parallel with a coolant loop in a fuel cell vehicle using a pump, comprising:
- collecting a measured temperature of the electronic components and a measured temperature of a coolant through a monitor;
- deriving pump RPM command values corresponding to the measured temperatures based on at least one of electronic component temperature maps, a coolant temperature map, and a temperature difference map representing temperature differences between the electronic components and the coolant;
- checking an over-temperature state with respect to each measured temperature based on each temperature map and setting an over-temperature set state and an over-temperature reset state of each measured temperature;
- performing FF control for increasing an RPM of the pump when a high torque and high temperature state is maintained for a predetermined period of time based on a motor torque reference value and an inverter temperature; and
- applying a maximum value of the pump RPM command values derived through the temperature maps as a final pump RPM command value when an FF control condition is not satisfied and at least one of the measured temperatures corresponds to the over-temperature set state.

13. The method of claim 12, wherein the deriving of the pump RPM command values comprises deriving a pump RPM command value for at least one of a motor temperature, an inverter temperature, an HV DC-DC converter temperature, an LV DC-DC converter temperature, and the temperature differences between the electronic components and the coolant.

14. The method of claim 12, wherein the setting of the over-temperature set state and the over-temperature reset state comprises checking whether at least one of a motor temperature, an inverter temperature, an HV DC-DC converter temperature, an LV DC-DC converter temperature, and the temperature differences between the electronic components and the coolant corresponds to the over-temperature state.

15. The method of claim 12, wherein the performing of feed forward the FF control comprises:
- deriving a FF pump RPM command value as a value greater than a predetermined percent of a maximum pump RPM upon initiation of the FF control; and
- applying a maximum value from among the pump RPM command values for the measured temperatures and the FF pump RPM command value as a final pump RPM command value.

16. The method of claim 12, further comprising controlling the final pump RPM command value to be a value lower than a predetermined percent of the maximum pump RPM when the FF control condition is not satisfied, each measured temperature corresponds to the over-temperature reset state and the vehicle is in a parking state, neutral state or low-speed state corresponding to a speed lower than a predetermined speed.

* * * * *